United States Patent [19]

McCarthy

[11] Patent Number: 5,014,845
[45] Date of Patent: May 14, 1991

[54] CONVEYOR WITH RIGIDLY LOCKED SECTIONS

[75] Inventor: Michael D. McCarthy, Kiel, Wis.
[73] Assignee: Metko, Inc., New Holstein, Wis.
[21] Appl. No.: 350,124
[22] Filed: May 8, 1989
[51] Int. Cl.[5] ............................................. B65G 19/18
[52] U.S. Cl. ............................... 198/735.2; 198/860.2
[58] Field of Search ............... 198/860.1, 860.2, 860.3, 198/735, 836, 837, 725, 728, 729, 583, 717, 721, 730, 734, 841, 735.2; 119/51 CF, 57.1, 57.2, 57.7, 57.92

[56] References Cited

U.S. PATENT DOCUMENTS

| 1,854,560 | 4/1932 | Owens et al. | 198/860.3 |
| 1,854,561 | 4/1932 | Owens et al. | 198/860.3 |
| 2,646,157 | 7/1953 | Belt | 198/730 X |
| 2,738,766 | 3/1956 | Hart | 198/725 X |
| 4,186,832 | 2/1980 | Kelley | 198/860.2 X |

FOREIGN PATENT DOCUMENTS

| 0593606 | 3/1960 | Canada | 198/860.1 |
| 377524 | 6/1973 | U.S.S.R. | 198/860.2 |
| 2125353 | 3/1984 | United Kingdom | 198/860.2 |

Primary Examiner—Robert P. Olszewski
Assistant Examiner—Cheryl L. Gastineau
Attorney, Agent, or Firm—Fuller, Ryan & Hohenfeldt

[57] ABSTRACT

A trough for a livestock feed conveyor, the conveyor having conveying devices such as paddles residing in the trough and a drive unit for moving the conveying devices within the trough so as to convey the feed. In a preferred embodiment, the trough is constructed of an upper trough portion, a lower trough portion attached to the upper trough portion, each trough portion including segments, with transverse boundaries between the segments, connecting plates for connecting the segments of each of the trough portions together, the relative lengths of the segments of both trough portions being chosen and assembled so that the boundaries between segments of the upper trough portion do not coincide with the boundaries between sections of the lower trough portion. According to a preferred embodiment, the connecting plates are splice plates removably connected to a leading end of one segment and a trailing end of an adjacent segment of the upper trough portion, and to the lower trough portion at a position spaced apart from and between the two ends of any segment of the lower trough portion.

11 Claims, 2 Drawing Sheets

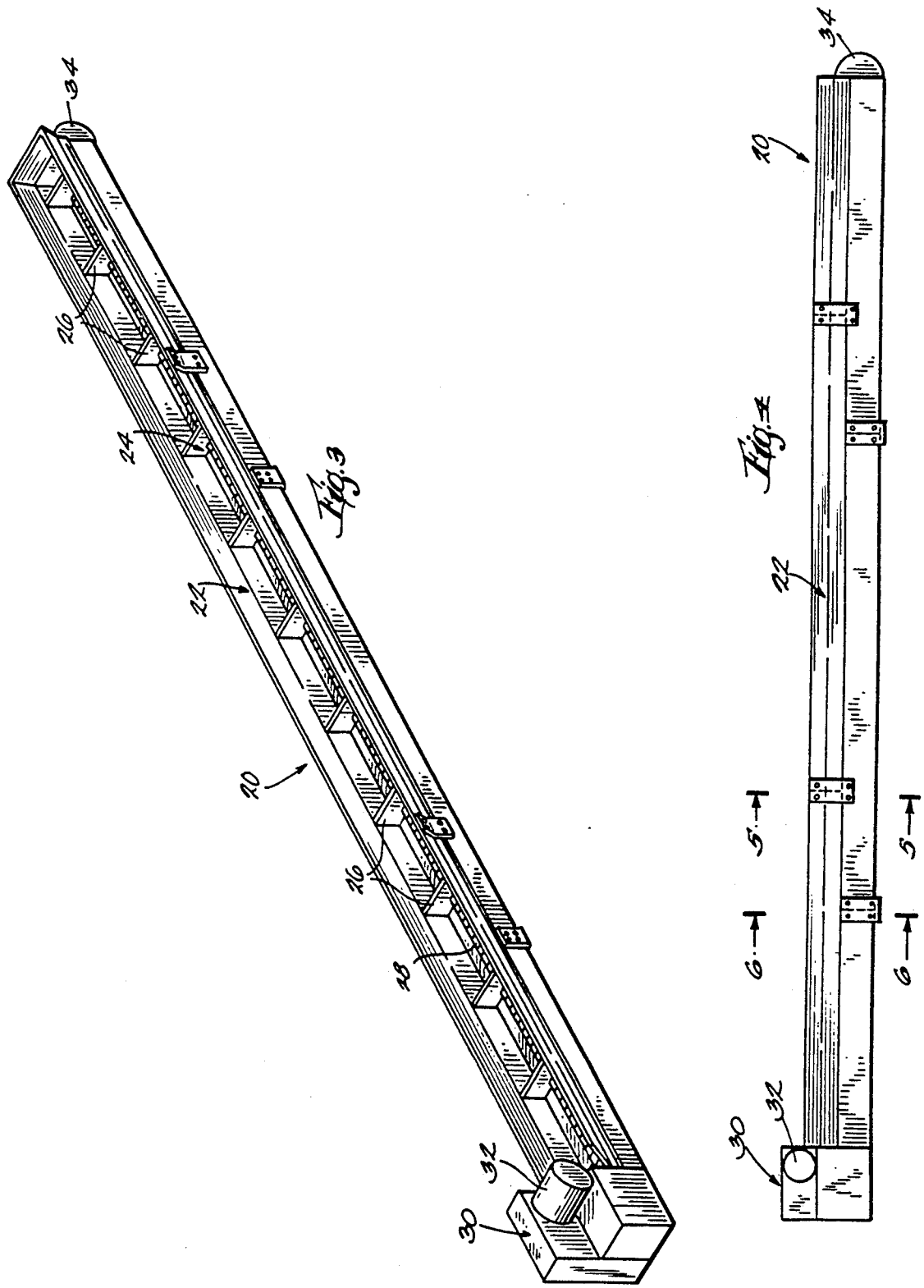

CONVEYOR WITH RIGIDLY LOCKED SECTIONS

BACKGROUND OF THE INVENTION

This invention relates to conveyors such as for conveying livestock feed, and in particular to chain conveyors having long spans which require some means of intermediate support to avoid sagging and accompanying leakage of feed or other conveyed material from the conveyor.

It is common for conveyor manufacturers and retailers to manufacture and stock chain conveyors in sections of a few different predetermined lengths, and to choose and assemble a number of different lengths to arrive at the overall length specified by the customer. An example of such an assembly is shown in FIG. 1, wherein two sections 10 and 12 of a conveyor 14 are bolted together by means of a joining plate 16 on the facing side and a similar plate (not shown) on the opposite side, to form a long conveyor. When assembled and installed, however, if support is only provided at the ends thereof, a gap 18 could develop, as shown in FIG. 2, at the junction between the two sections. Such gaps could cause leaks and loss of feed, and certainly loss of efficiency in transport of the feed. To prevent sagging and thus avoid these gaps, extra support had to be provided between the ends, whether from above or below, resulting in extra expense of parts and labor in installation. A market thus exists for such modular construction accomplished without the added expense of additional intermediate support of the conveyor sections.

This invention relates to improvements to the apparatus described above and to solutions to the problems raised or not solved thereby.

SUMMARY OF THE INVENTION

The invention includes a trough for a livestock feed conveyor, the conveyor having conveying means residing in the trough and means for moving the conveying means within the trough so as to convey the feed. In a preferred embodiment, the trough is constructed of an upper trough portion, a lower trough portion attached to the upper trough portion, each trough portion including segments, with transverse boundaries between the segments, connecting means for connecting the segments of each of the trough portions together, the relative lengths of the segments of both trough portions being chosen and assembled so that the boundaries between segments of the upper trough portion do not coincide with the boundaries between sections of the lower trough portion. According to a preferred embodiment, the connecting means includes splice plates removably connected to a leading end of one segment and a trailing end of an adjacent segment of the upper trough portion, and to the lower trough portion at a position spaced apart from and between the two ends of any segment of the lower trough portion.

Other objects and advantages of the invention will become apparent hereinafter.

DESCRIPTION OF THE DRAWING

FIG. 3 is an isometric view of a conveyor constructed according to a preferred embodiment of the invention.

FIG. 4 is a side elevation view of the conveyor shown in FIG. 3.

DESCRIPTION OF THE PREFERRED EMBODIMENT

Figure 5:
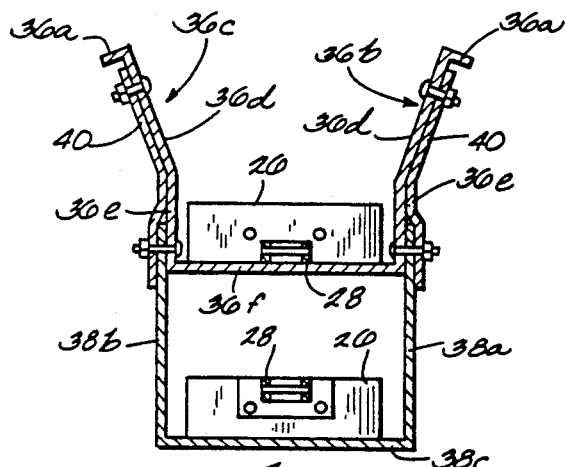
FIG. 5 is a cross sectional view of the conveyor shown in FIG. 4, taken along line 5—5, showing two upper conveyor sections and a lower section joined by a splice plate.

Referring now to FIGS. 3 and 4, there is shown a conveyor apparatus 20 constructed according to a preferred embodiment of the invention. This conveyor apparatus 20 includes a trough 22 into which any particulate matter such as livestock feed may be deposited. The conveyor apparatus 20 further includes conveying means 24 residing in the trough 22 for conveying the particulate matter In the embodiment shown in FIG. 3, the conveyor apparatus 20 is a chain type conveyor, so that conveying means 24 is a plurality of paddles 26 each attached to an endless chain 28. The paddles 26 and chain 28, and hence the conveying means 24, is moved in the trough 22 by any suitable drive means 30, including such well known drive means as an electric motor 32 and associated gearing and/or chain or belt drive (not shown), generally attached to the trough at one end thereof. At the other end of the trough 22 is attached any suitable terminating means, such as a base 34, generally including an idler gear (not shown) about which the chain 28 may be reeved.

In the preferred embodiment, as shown in FIGS. 3 through 8, the trough 22 is divided horizontally into an upper trough portion 36 and a lower trough portion 38. These upper and lower portions 36 and 38 in turn are divided vertically into sections, each of a certain, predetermined length. The number and length of the sections chosen is determined by the overall length desired for the conveyor 20, including the known length of the drive means 30 and the base 34. For instance, assuming that the combined length of the drive means 30 and base 34 is 1.5 feet, and that section lengths of 5, 7.5 and 10 feet are available, a 24 foot conveyor would include one of each of the three section lengths. A 21.5 foot conveyor would require one 5 foot length and two 7.5 foot lengths.

Of critical importance, however, is the structure as assembled. That is, in the conveyor 20 shown in FIGS. 3 and 4, boundaries between the sections of the upper portion 36 are nonaligned with the boundaries between the sections of the lower section 38. Referring to the 24 foot conveyor given in the example above, for instance, the upper portion 36 could be constructed of first the 7.5 foot section, then the 10 foot section, and finally the 5 foot section. The lower portion, on the other hand, would then be constructed of first the 5 foot section, then the 10 foot section and last the 7.5 foot section. This nonalignment of the upper section boundaries with the lower section boundaries results in much greater strength of the entire conveyor 20, permitting longer spans, without intermediate support, than were available in the prior art.

Figure 6:
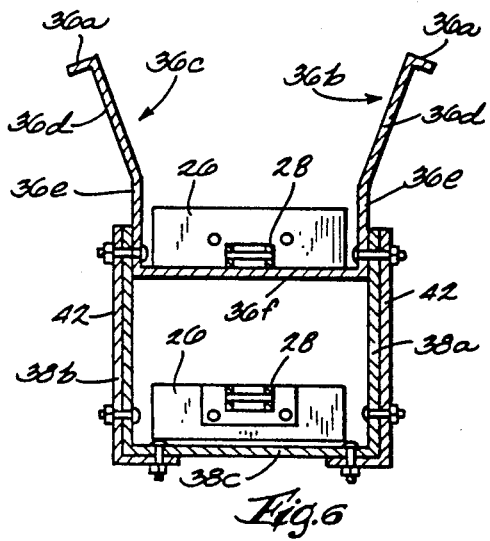
FIG. 6 is a cross sectional view of the conveyor shown in FIG. 4, taken along line 6—6, showing an upper conveyor section and two lower sections joined by a lower splice plate.

As shown in FIGS. 5 and 6, each section of the upper portion 36 is preferably formed from a single piece of metal to reduce leaking and corrosion, and for ease of manufacture. Each such section includes a lip 36a at the upper edge of each of two sides 36b and 36c, a funnel area 36d below each lip area which angles part way downward and toward the opposite side, a vertical portion 36e below each funnel area, and a flat bottom 36f integrally joining the vertical portions at bottom ends thereof. Each section of the lower portion 38 is also formed from a single piece of metal, for the same reasons, and includes a vertical portion 38a and 38b at each side, and a flat bottom 38c integrally joining the vertical portions at the bottom ends thereof.

Figure 7:
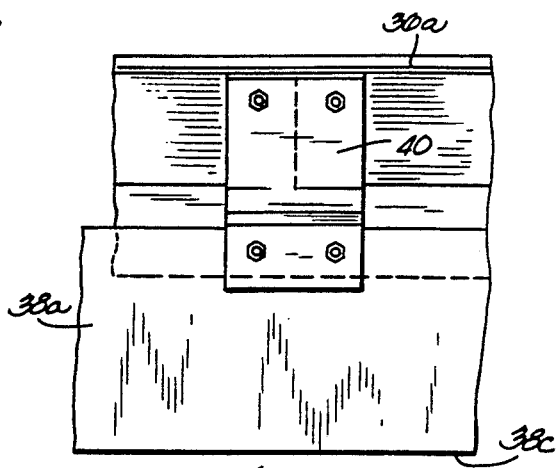
FIG. 7 is an enlarged side view of the conveyor shown in FIG. 4, showing the two upper conveyor sections and the lower section joined by an upper splice plate.

As shown in FIGS. 5 and 7, adjacent sections of the upper portion 36 are joined together by upper splice plates 40. These plates 40 are bolted to the sides 36b and 36c of the upper portion beginning in the funnel portion 36d thereof. The plates 40 continue down the sides overlapping the vertical portions 36e of the sides 36b and 36c. In the most preferred embodiment, the plates 40 continue down onto the vertical portions 38a and 38b of the lower portion 38, and are there bolted to the lower portion, so that the bolts pass through three thicknesses of metal, the upper portion 36, the lower portion 38 and the splice plate 40. The fact that these bolts pass through three thicknesses of metal as just described contributes to the substantial improvement in the rigidity referred to above.

Figure 8:
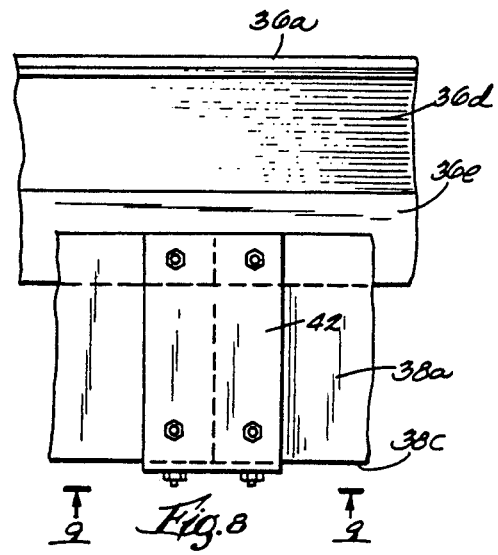
FIG. 8 is an enlarged side view of the conveyor shown in FIG. 4, showing the upper conveyor section and the two lower sections joined by a lower splice plate.
Figure 2:
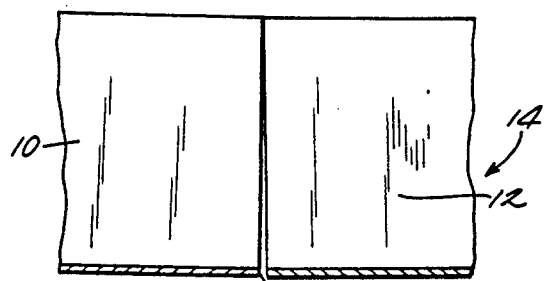
FIG. 2 is an enlarged side view of a junction point between two sections of a prior art conveyor.
Figure 9:
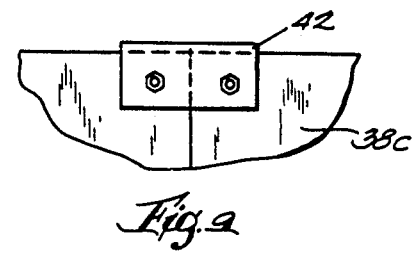
FIG. 9 is a bottom view of the portions of the lower conveyor sections and splice plate shown in FIG. 8, taken along line 9—9.
Figure 1:
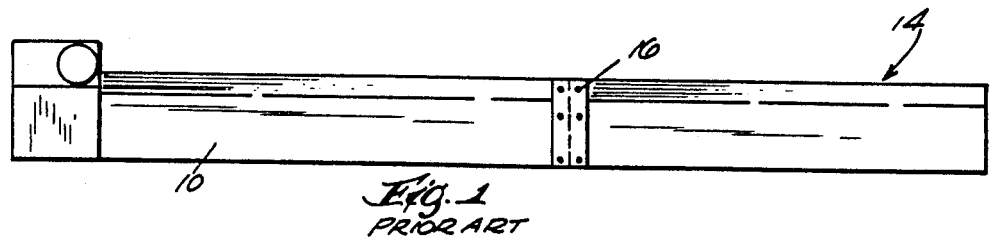
FIG. 1 is a side view of a prior art conveyor.

As shown in FIGS. 6 and 8, adjacent sections of lower portion 38 are joined together by lower splice plates 42. These plates 42 are bolted to the vertical portions 38a and 38b of the lower portion. Here again the bolts pass through three layers of metal, the upper portion 36, the lower portion 38 and the splice plate 42, again improving rigidity. In addition, as can be seen by comparing FIGS. 6 and 8 to FIG. 9, in the most preferred embodiment the lower splice plates 42 wrap under the bottom portion 38c of the lower portion 38 and are bolted thereto.

The structure described hereinabove yields a substantial improvement in rigidity over presently known structures, often obviating the need for any support structure other than at the ends of the conveyor 20, while still maintaining tight closure of the various sections one to another and still keeping to a minimum the necessary inventory items for dealers and manufacturers.

While the apparatus hereinbefore described is effectively adapted to fulfill the aforesaid objects, it is to be understood that the invention is not intended to be limited to the specific preferred embodiment of conveyor set forth above. Rather, it is to be taken as including all reasonable equivalents within the scope of the following claims.

I claim:

1. A conveyor for conveying livestock feed, comprising:
   a trough;
   a conveying means residing in said trough;
   drive means for moving said conveying means within said trough;
   said trough being formed of an upper portion, and a lower portion attached to said upper portion, each said portion including segments, with transverse boundaries between said segment, and
   connecting means for rigidly connecting the segments of each said portion together to thereby prevent any pivoting between adjacent segments and eliminate the need for support structure between the ends of the conveyor;
   the lengths of said segments of both of said portions being chosen, and said segments being assembled together, such that said boundaries of said upper portion are non-aligned with said 2. A conveyor as recited in claim 1 wherein said conveying means includes a plurality of paddles, each attached to an endless chain.

3. A conveyor as recited in claim 2 wherein each segment of said upper portion is formed from a single piece of metal and includes a lip at the upper edge of each of two sides, a funnel area below each lip area which angles part way downward and toward the opposite side, bottom integrally joining the vertical portions at bottom ends thereof.

4. A trough as recited in claim 3 wherein each segment of said lower portion is formed from a single piece of metal and includes a vertical portion at each side, and a flat bottom integrally joining the vertical portions at bottom ends thereof.

5. A trough as recited in claim 2 wherein said connecting means includes splice plates removably connected to a leading end of one segment and a trailing end of an adjacent segment of said upper portion and to said lower portion at a position spaced apart from either end of a segment of said lower portion.

6. A trough as recited in claim 4 wherein said connecting means includes splice plates removably connected to the sides and bottom of a leading end of one segment and a trailing end of an adjacent segment of said lower portion.

7. A trough for a livestock feed conveyor, comprising:
   an upper trough portion and a lower trough portion attached to said upper trough portion, each said trough portion including segments, with transverse boundaries between said segments,
   the relative lengths of said segments of both of said trough portions being chosen and connected rigidly together by non-rotatable connecting means so that said boundaries of said upper trough portion do not coincide with said boundaries of said lower trough portion to thereby prevent any pivoting between adjacent segments of the conveyor.

8. A trough as recited in claim 7 wherein each segment of said upper trough portion is formed from a single piece of metal and includes a lip at the upper edge of each of two sides, a funnel area below each lip area which angles part way downward and toward the opposite side, a vertical portion below each funnel area, and a flat bottom integrally joining the vertical portions at bottom ends thereof.

9. A trough as recited in claim 8 wherein each segment of said lower trough portion is formed from a single piece of metal and includes a vertical portion at each side, and a flat bottom integrally joining the vertical portions at bottom ends thereof.

10. A trough as recited in claim 7 wherein said connecting means includes splice plates removably connected to a leading end of one segment and a trailing end of an adjacent segment of said upper trough portion and to said lower trough portion at a position spaced apart from either end of a segment of said lower trough portion.

11. A trough as recited in claim 9 wherein said connecting means includes splice plates removably connected to the sides and bottom of a leading end of one segment and a trailing end of an adjacent segment of said lower trough portion.

* * * * *

UNITED STATES PATENT AND TRADEMARK OFFICE
CERTIFICATE OF CORRECTION

PATENT NO. : 5,014,845
DATED : May 14, 1991
INVENTOR(S) : Michael D. McCarthy

It is certified that error appears in the above—identified patent and that said Letters Patent is hereby corrected as shown below:

Column 4, line 6:

Delete "segment" and substitute --- segments ---.

Column 4, line 15:

After "said" insert --- boundaries of said lower portion. ---

Column 4, line 24:

After "side," and before "bottom" insert --- a vertical portion below each funnel area, and a flat ---.

Signed and Sealed this

Thirteenth Day of October, 1992

*Attest:*

DOUGLAS B. COMER

*Attesting Officer*      *Acting Commissioner of Patents and Trademarks*